(12) United States Patent
Molewyk et al.

(10) Patent No.: US 8,362,878 B2
(45) Date of Patent: Jan. 29, 2013

(54) TOWEL TRACKING SYSTEM

(75) Inventors: Steven P. Molewyk, Marne, MI (US); Jack E. Spaans, Sparta, MI (US); Steven J. Lilly, Wyoming, MI (US); Chad A. Davis, Grand Rapids, MI (US); Kirk S. Thomas, Belding, MI (US); Jeffrey A. Davis, Wayland, MI (US)

(73) Assignee: R.E.D. Stamp, Inc., Grand Rapids, MI (US)

( * ) Notice: Subject to any disclaimer, the term of this patent is extended or adjusted under 35 U.S.C. 154(b) by 409 days.

(21) Appl. No.: 12/814,631

(22) Filed: Jun. 14, 2010

(65) Prior Publication Data

US 2011/0304433 A1    Dec. 15, 2011

(51) Int. Cl.
*H04Q 5/22* (2006.01)
*A47B 81/00* (2006.01)

(52) U.S. Cl. .................. 340/10.1; 340/10.2; 312/211

(58) Field of Classification Search ............... 340/10.1, 340/572.1, 5.1, 5.2, 5.31, 5.7, 5.8, 5.81, 5.9, 340/5.91, 5.92, 10.4, 10.5; 700/231–244; 221/123, 133, 99, 185; 705/28; 312/249.9, 312/291, 292, 211, 212, 34.1, 34.4, 311
See application file for complete search history.

(56) References Cited

U.S. PATENT DOCUMENTS

| | | | | |
|---|---|---|---|---|
| 2,531,444 A | * | 11/1950 | Lane | 312/211 |
| 3,251,448 A | * | 5/1966 | Kienel | 194/211 |
| 3,794,148 A | * | 2/1974 | Copp | 194/212 |
| 5,313,393 A | * | 5/1994 | Varley et al. | 705/28 |
| 5,713,270 A | * | 2/1998 | Fitzgerald et al. | 100/49 |
| 6,169,483 B1 | * | 1/2001 | Ghaffari et al. | 340/572.3 |
| 6,330,856 B1 | * | 12/2001 | Fitzgerald et al. | 100/52 |
| 6,439,500 B1 | | 8/2002 | Shoenfeld | |
| 6,708,879 B2 | | 3/2004 | Hunt | |
| 7,142,118 B2 | | 11/2006 | Hamilton et al. | |
| 7,809,470 B2 | * | 10/2010 | Shoenfeld | 700/243 |
| 2002/0063033 A1 | * | 5/2002 | Ben-Naim et al. | 194/214 |
| 2006/0016885 A1 | | 1/2006 | Roberts et al. | |
| 2006/0085297 A1 | | 4/2006 | Minerley | |
| 2006/0217836 A1 | | 9/2006 | Poliner | |
| 2006/0226988 A1 | | 10/2006 | Ernst et al. | |
| 2006/0290471 A1 | | 12/2006 | Van Alstyne | |
| 2007/0112649 A1 | | 5/2007 | Schlabach | |
| 2008/0015956 A1 | | 1/2008 | Regard | |
| 2008/0091659 A1 | | 4/2008 | McFaul | |
| 2008/0119957 A1 | | 5/2008 | Ellis et al. | |
| 2008/0122615 A1 | | 5/2008 | Shoenfeld | |

* cited by examiner

*Primary Examiner* — Daniel Wu
*Assistant Examiner* — Mancil Littlejohn
(74) *Attorney, Agent, or Firm* — Price Heneveld LLP

(57) ABSTRACT

A system for dispensing, receiving, and tracking towels or other items includes a cabinet structure having first and second interior spaces. An access door provides access to the first interior space, and a return door permits items to be returned to the second interior space. An RFID system conducts read operations to determine how many items having RFID tags are disposed in the first and second interior spaces. The system determines what items have been removed from the first interior space, and associates removed items with specific users. The RFID system conducts read operations as items are returned to the second interior space and credits the user.

24 Claims, 6 Drawing Sheets

TOWEL TRACKING SYSTEM

BACKGROUND OF THE INVENTION

Athletic facilities at universities, colleges, and other athletic facilities, as well as health clubs, gyms, spas, and other such businesses or entities may provide clean towels for users of the facilities. Similarly, hotels, resorts, and the like may also provide clean towels to users. The users are typically expected to return the used towels prior to leaving the facility, and the towels are laundered and made available for users. Also, hospitals or other such medical facilities may provide clean garments for various personnel that are returned to the facility for laundering and redistribution to the personnel. Uniforms or other garments may be distributed to users in a variety of settings and returned for laundering. Still further, a variety of items from a storage area may be provided to users for a period of time. For example, in a machine shop, production facility, or construction site, a number of tools may be stored at a "tool crib" or other facility, and individual workers can remove the tools for use for a period of time. In such cases, a system for tracking the tools or other articles may be utilized. Similarly, libraries typically include a system to check out books or other articles to users and generate notices and/or charges if a book has not been returned within a specified period of time.

SUMMARY OF THE INVENTION

One aspect of the present invention is a dispensing and receiving system for dispensing clean towels or other items. The system includes a cabinet structure having a first portion defining a first interior space configured to have clean towels or other items to be dispensed therein, and a second portion defining a second interior space configured to have used towels or other items disposed therein upon return by a user. The first and/or second interior spaces may be heated and/or cooled if required for a particular application. The cabinet structure also has an enlarged first opening providing access to the first interior space and an enlarged second opening providing access to the second interior space.

A first main door is movably mounted to the cabinet structure for movement between an open position providing access to the first interior space through the enlarged first opening, and a closed position wherein the first main door closes off the enlarged first opening. The first main door has a first access opening to provide access therethrough, and an access door is movably mounted to the first main door for movement between an open position permitting a user to reach through the first access opening when the first main door is in the closed position, and a closed position that prevents access to clean towels or other items in the first interior space.

A second main door is movably mounted to the cabinet structure for movement between an open position providing access to the second interior space through the enlarged second opening, and a closed position wherein the second main door closes off the enlarged second opening. The second main door has a second access opening therethrough. A return door is movably mounted to the second main door for movement between an open position that permits towels to pass through the second access opening into the second interior space, and a closed position. A first powered lock selectively prevents movement of the access door to the open position. An optional second powered lock may be utilized to selectively retain the return door in the closed position.

The dispensing and receiving system further includes an RFID system including at least a first RFID antenna configured to provide electromagnetic waves in the first interior space, and at least a second RFID antenna configured to provide electromagnetic waves in the second interior space. The RFID system is configured to perform read operations during which at least one of the first and second antennas generate electromagnetic energy and receive return energy from RFID tags disposed in the first and second interior spaces, whereby a number of towels disposed in the first and second interior spaces can be determined During a read operation, electromagnetic energy from the first RFID antenna does not enter the second interior space, and electromagnetic energy from the second RFID antenna does not enter the first interior space, such that the RFID system can obtain an accurate read of the items in the first interior space and in the second interior space. The first and second interior spaces may be isolated from one another by a sheet of electrically conductive material or other suitable barrier, or the first and second interior spaces may comprise two separate free-standing metal cabinets that can be repositioned relative to one another. Alternately, the cabinet structure may comprise a polymer or fiber-reinforced composite material that preferably includes a conductive layer or coating.

The dispensing and receiving system also includes a user verification device that collects data that can be used to identify a user. The user verification device may comprise an optical card reader that reads a barcode on a membership card, or it may comprise a card reader that reads an electromagnetic strip on a membership card, or other suitable verification device such as a keypad or the like that provides for input of a password. The dispensing and receiving system also includes a control system that is operably interconnected to the first and second powered locks, and to the first and second RFID antennas. The control system is configured to actuate the RFID system and generate a first data set corresponding to a number of towels in the first interior space. This read operation is performed upon opening and/or closing of the first main door, which typically occurs when the first interior space is restocked with clean towels. In this way, the control system is able to generate an inventory of the towels in the first interior space. As discussed in more detail below, the control system generates additional read operations of the first interior space upon opening and/or closing of the access door when a user removes towels and associates the towels removed from the first interior space with the particular user identified by the user verification device. The control system is also configured to selectively control the first powered lock to unlock the access door based, at least in part, on data from the user identification device. In this way, the control system prevents unauthorized users from opening the access door to take towels from the first interior space. The control system may also be configured to cause the RFID system to perform a read operation of the towels in the second interior space upon opening and/or closing of the second main door as occurs when the second main door is opened to remove used towels. The control system causes the RFID system to conduct a read operation of the second interior space upon opening and closing of the return door to determine if towels previously removed from the first interior space have been returned to the second interior space. The control system may be configured to generate a list of towels that have been taken out by each individual user, and towels may be removed from the list if the control system determines, via the RFID system, that the towels have been returned to the second interior space. The control system may be configured to prevent opening of the access door and/or the return door during a read operation to ensure that an accurate read operation is performed. The system may include a mobile rack or shelf unit that can be rolled into and out of the first interior space through the enlarged first opening when the first main door is in an open position such that the first interior space can be readily restocked with clean towels. The system may also include a mobile bin or the like that can be disposed in the second interior space to receive used towels.

These and other features, objects, and advantages of the present invention will become apparent upon reading the following description thereof together with reference to the accompanying drawings.

DETAILED DESCRIPTION OF THE PREFERRED EMBODIMENT

Figure 1:
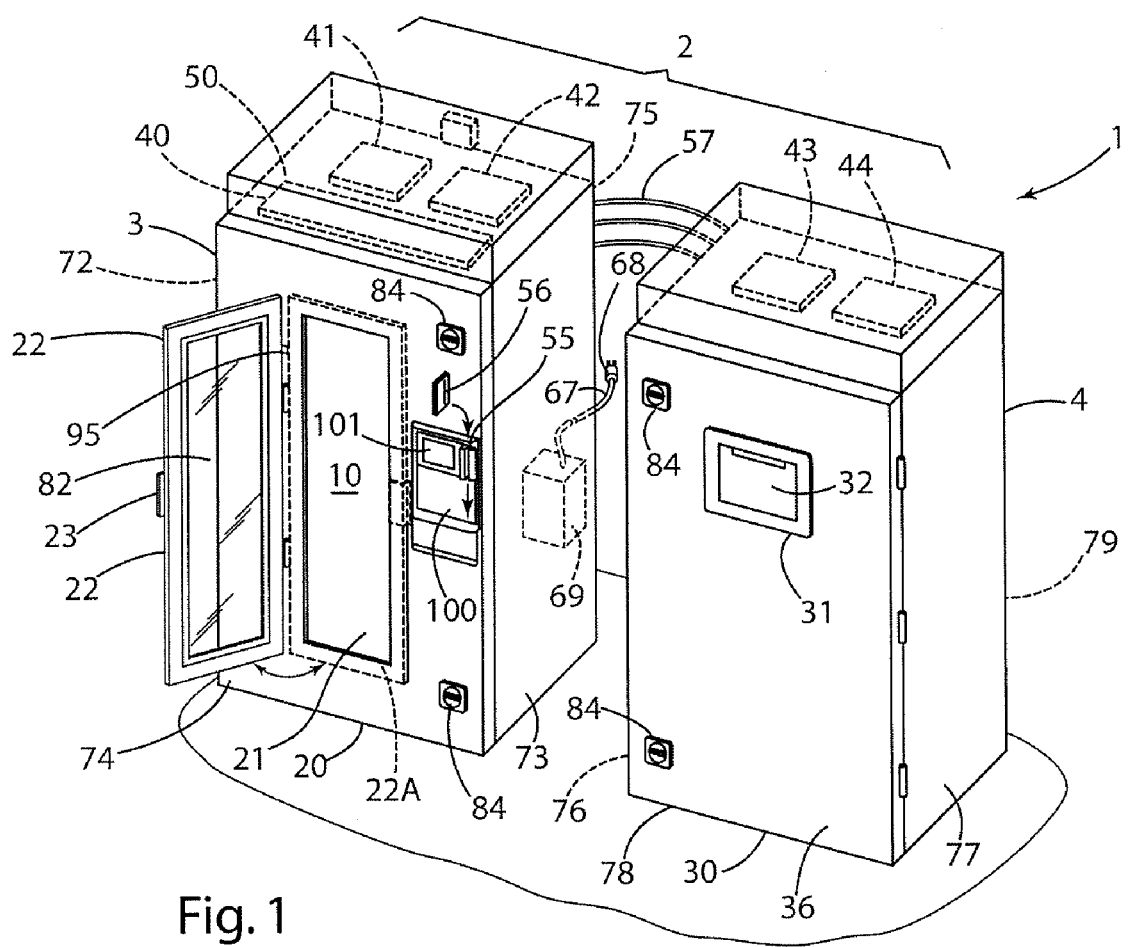
FIG. 1 is a partially fragmentary isometric view of a system for dispensing and receiving items according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, an article dispensing and tracking system 1 includes a cabinet structure 2 having a first cabinet or portion 3 and a second cabinet or portion 4. In the illustrated example, the cabinet structure 2 comprises two discreet cabinet structures that are not structurally interconnected. However, the cabinet structure 2 could comprise a single cabinet having first and second portions. According to one aspect of the present invention, first cabinet 3 is configured to dispense articles, such as clean towels, and cabinet 4 is configured to receive used towels that are returned.

Figure 2:
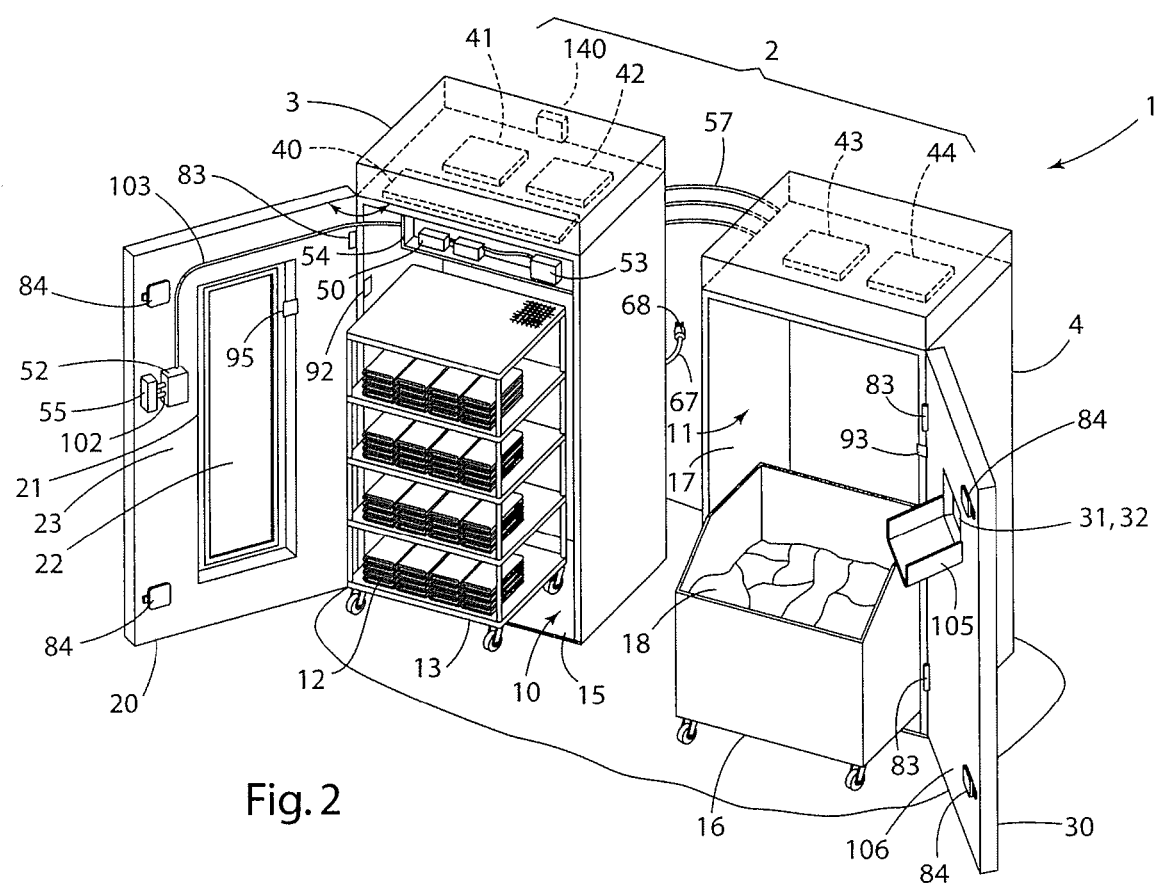
FIG. 2 is a partially fragmentary isometric view of the system of FIG. 1, wherein the first and second main doors are shown in an open position.

With further reference to FIG. 2, the first cabinet 3 defines a first interior space 10, and the second cabinet 4 defines a second interior space 11. As discussed in more detail below, clean towels 12 may be positioned on a mobile rack or shelf unit 13 that can be moved into and out of first interior space 10 through an enlarged first opening 15 of first cabinet 3. Similarly, a mobile bin 16 can be moved into and out of second interior space 11 through an enlarged second opening 17 in second cabinet 4 to thereby remove used towels 18 from second cabinet 4. A first main door 20 is movably mounted to the first cabinet 3 for movement between an open position (FIG. 2) to provide access to the first interior space 10 through the enlarged first opening 15, and a closed position (FIG. 1) wherein the first main door 20 closes off the enlarged first opening 15. The first main door 20 has a first access opening 21 that provides access to the clean towels 12 or other articles disposed in the first interior space 10 when the first main door 20 is in the closed position (FIG. 1). An access door 22 is movably mounted to the first main door 20 for movement between an open position (FIG. 1) permitting a user to reach through the first access opening 21 when the first main door 20 is in the closed position, and a closed position (22A) that prevents access to the clean towels 12 or other items in the first interior space 10. A second main door 30 is movably mounted to the second cabinet 4 of the cabinet structure 2 for movement between an open position (FIG. 2) providing access to the second interior space 11 through the enlarged second opening 17, and a closed position (FIG. 1) wherein the second main door 30 closes off the enlarged second opening 17. The second main door 30 has a second access opening 31 (see also FIG. 4) through the second main door 30. A return door 32 is movably mounted to the second main door 30 by a hinge 33 (FIG. 4) or other suitable arrangement for movement between an open position (32A in FIG. 4) that permits used towels to pass through the second access opening 31 into the second interior space 11, and a closed position (FIG. 1) preventing access to the second interior space 11. A first powered lock 23 selectively prevents movement of the access door 22 to the open position (FIG. 1). An optional second powered lock 34 (FIG. 4) may be utilized to selectively retain the return door 32 in the closed position.

The dispensing and receiving system 1 also includes an RFID system 40 including one or more RFID antennas 41, 42 that are configured to provide electromagnetic waves in the first interior space 10, and one or more RFID antennas 43, 44 that are configured to provide electromagnetic waves in the second interior space 11. According to another aspect of the present invention, three RFID antennas may be disposed in one of the interior spaces 10 and 11, and one RFID antenna may be disposed in the other of the interior spaces 10 and 11. It will be understood that the specific configuration of the RFID antennas may be selected according to the requirements of a particular application. The RFID system 40 is configured to perform read operations during which at least one of the RFID antennas 41-44 generate electromagnetic energy and receive return energy from RFID tags 45 (see also FIG. 6) disposed in the clean towels 12 or used towels 18 disposed in the first and/or second interior spaces 10 and 11, respectively. As discussed in more detail below, a number of clean towels 12 disposed in first interior space 10 and/or a number of used towels 18 disposed in second interior space 11 can be determined based on the data received from the RFID read operation.

A user verification device, such as a card reader 55, collects data that can be used to identify a user. In the illustrated example, the user verification device comprises a card reader 55 that reads membership cards 56 having bar codes disposed thereon. However, other user verification devices could also be utilized. In general, card reader 55 is selected to read membership cards 56 that are also utilized by a health club or other facility to identify members at the time they enter the facility. The article dispensing and receiving system 1 also includes a control system 50 that may include a controller 52 that is mounted to first main door 20 and other components 53 mounted to a movable support or tray 54 disposed in first cabinet 3. Controller 52 may comprise a PC, a PLC, or other suitable controller. Controller 52 may be mounted to tray 54 or other suitable location other than door 20. Some of the control system components may also be mounted in second cabinet 4. For example, a first controller may be mounted in cabinet 3, and a second controller may be mounted in cabinet 4. Also, as discussed in more detail below in connection with FIG. 5, control system 50 may include additional components, such as a server 60 and optional host computer system 61 that are operably interconnected by a network 62 that may comprise a wireless network including a plurality of antennas 64-66 and associated hardware and software. In the illustrated example, cabinets 3 and 4 are interconnected by one or more power and/or data lines 57. In the illustrated example, a single electrical power line 67 with a conventional 110 volt plug 68 supplies power to a power supply/transformer 69. One or more of the lines 57 may comprise a power line that supplies power from cabinet 3 to cabinet 4. However, cabinets 3 and 4 can also be separately powered. Cabinets 3 and 4 may be remotely positioned relative to one another, with the cabinets 3 and 4 being operably interconnected by a wireless network, a data communication line, or other suitable arrangement. The control system 50 is operably interconnected with the first powered lock 23 to selectively actuate the lock 23 to control access through access door 22. If system 1 includes a second powered lock 34, control system 50 may be operably connected to lock 34 to control access through return door 32. Control system 50 is also operably connected to the RFID antennas 41-44, and the control system 50 is configured to actuate the RFID system 40 to generate a first data set corresponding to a number of clean towels 12 in the first interior space 10 upon opening and/or closing of the first main door 20. The first data set may comprise an initial inventory corresponding to the number of clean towels 12 disposed in the first interior space 10 of first cabinet 3 after mobile rack 13 and clean towels 12 are moved into the first interior space 10, but prior to removal of any clean towels 12 by a user. The control system 50 selectively controls the first powered lock 23 to unlock the access door 22 based, at least in part, on data from the user identification device or card reader 55. Control system 50 is configured to actuate the RFID system 40 and generate a second data set corresponding to a number of towels 12 in first interior space 10, such that a number of towels 12 removed from first interior space 10 can be determined by taking a difference between the first and second data sets.

Figure 3:
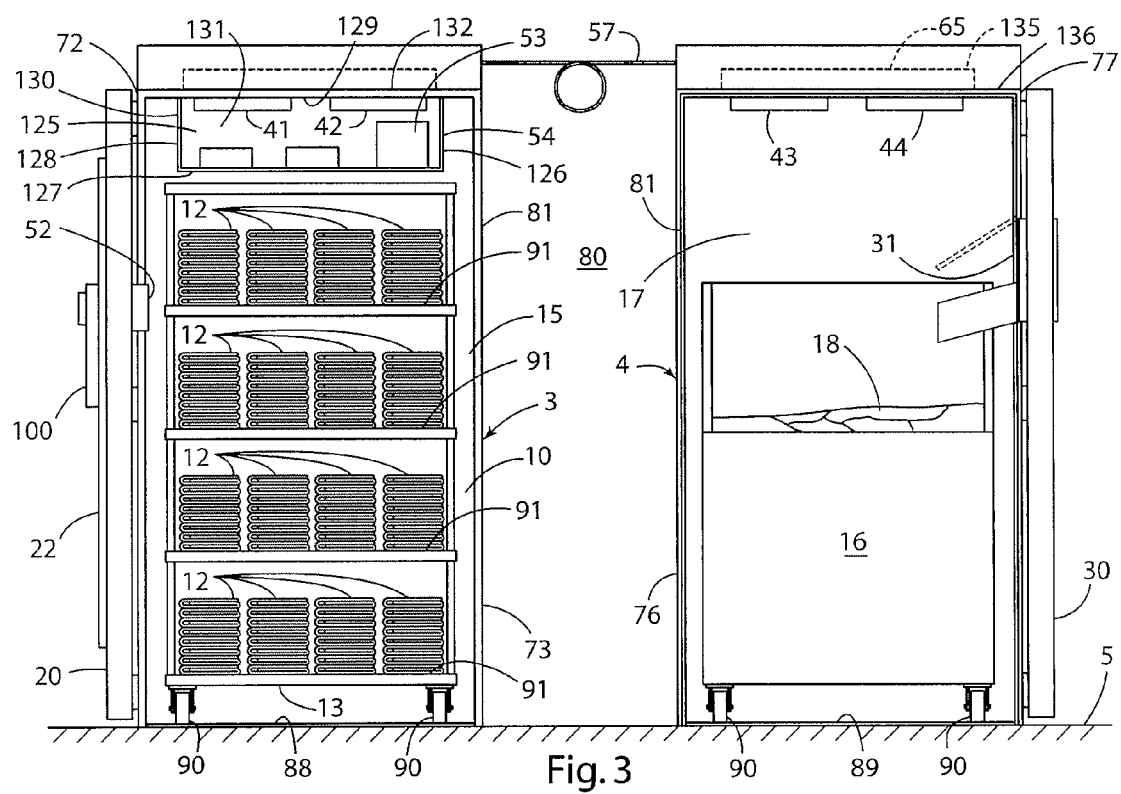
FIG. 3 is a front elevational view of the system of FIG. 1, with the first and second main access doors in open positions.

Referring again to FIGS. 1 and 2, in the illustrated example, first cabinet 3 has generally upright opposite sides 72 and 73, and upright front and rear sides 74 and 75, respectively. Similarly, cabinet 4 includes opposite sides 76 and 77 and upright front and rear sides 78 and 79, respectively. With further reference to FIG. 3, cabinets 3 and 4 may be spaced-apart to form a gap 80 between the cabinets 3 and 4 with the cabinets 3 and 4 being positioned adjacent one another on a floor surface 5. In a preferred embodiment, each cabinet 3, 4 has a total height of about 80 inches, a side-to-side width of about 40 inches, and a front-to-back depth of about 34-35 inches. However, it will be understood that the dimensions of the cabinet structure 2 may be configured as required for dispensing articles other than towels, and to accommodate the needs of different facilities utilizing the dispensing and tracking system 1. Cabinets 3 and 4 may, alternately, comprise a single structural unit defining the first and second interior spaces 10 and 11. Cabinets 3 and 4 are preferably made of a relatively thin sheet metal material that prevents escape of signals from RFID antennas 41-44. First interior space 10 is isolated by cabinet structure 2 from second interior space 11. This prevents RFID antennas 41 and 42 from receiving signals from RFID tags on used towels 18 disposed in second interior space 11. Similarly, RFID antennas 43 and 44 of second cabinet 4 do not receive signals from RFID tags of clean towels 12 disposed within interior space 10.

In a preferred embodiment, elongated seals 81 extend around enlarged first and second openings 15 and 17 of first and second cabinets 3 and 4, respectively. Seals 81 comprise commercially available seals configured to prevent escape of electromagnetic signals from RFID antennas and/or RFID tags when the first and second main access doors 22 and 30 are in their respective closed position relative to the other portions of the cabinet structures 3 and 4, respectively. RFID seals may also be utilized at first access opening 21 of first cabinet 3 and second access opening 31 of second cabinet 4. In a preferred embodiment, access door 22 includes a light-transmitting sheet, such as a glass sheet 82. Glass sheet 82 may comprise commercially available glass having a conductive layer or other properties that cause it to prevent transmission of RFID signals therethrough.

The main doors 20 and 30 are preferably pivotally mounted to first and second cabinet structures 3 and 4, respectively, by one or more hinges 83 or other suitable arrangement. One or more locks 84 selectively lock main doors 20 and 30 in their respective closed positions to prevent unauthorized access to the first and second interior spaces 10 and 11, respectively. Locks 84 may comprise mechanical locks which require use of a key by authorized personnel. Locks 84 could comprise powered locks that are operably connected to the control system 50, and control system 50 may be configured to prevent locks 84 from being actuated if the RFID system 40 is conducting a read operation. Also, if locks 84 comprise powered locks, control system 50 may be configured to prevent actuation/release of locks 84 unless appropriate authorization is detected by control system 50 from card reader 55 or other authorization input device.

Referring again to FIG. 3, cabinet 3 preferably includes a relatively thin (i.e., low height) lower member 88 disposed immediately adjacent floor surface 5 and extending across enlarged first opening 15. Similarly, cabinet 4 preferably includes a relatively thin horizontal member 89 extending across a lower portion of enlarged second opening 17. Mobile rack 13 and mobile bin 16 include a plurality of rollers or casters 90, such that the mobile rack 13 and mobile bin 16 into and out of interior spaces 10 and 11, respectively. In the illustrated example, mobile rack 13 includes a plurality of horizontal support surfaces, such as shelves 91, that support stacks of clean towels 12. In use, control system 50 may be configured to generate a signal when the number of clean towels 12 in first interior space 10 falls below a predefined number of towels 12, and/or if the RFID system 40 indicates that no towels 12 are presently disposed in first interior space 10. Upon receiving a "low towel" or "empty" signal, a user can open first main door 20, roll a first mobile rack 13 out of first interior space 10, and roll a second mobile rack 13 (not shown) having a large number of clean towels 12 thereon into first interior space 10. If a relatively small number of clean towels are disposed on the first mobile rack 13 at the time it is removed from first interior spaced 10, a user can transfer the clean towels 12 to the second mobile rack 13 if there is sufficient space on the second mobile rack 13. This way, one or more additional mobile racks 13 can be preloaded with clean towels 12 at a central laundry processing facility (not shown) to permit rapid restocking of first cabinet 3 with clean towels 12.

Mobile bin 16 can be rolled into and out of second interior space 11 and additional mobile bins 16 (not shown) may be provided. Controller 50 may be configured to generate a signal to a user if a number of used towels 18 detected by RFID system 40 is at or exceeds a predefined number. A user can then open second access door 30, roll a mobile bin 16 and used towels 18 out of second interior space 11, and immediately roll an empty mobile bin 16 into interior space 11. Door 30 can then be closed and locked.

Referring again to FIG. 2, first cabinet 3 may include a sensor 92 that is operably connected to the control system 50 and second cabinet 4 may include a sensor 93 that is also operably connected to the control system 50. Sensors 92 and 93 provide a signal to the control system 50 indicating that main doors 20 and 30 are open or closed. As discussed in more detail below, controller 50 may be configured to utilize information from sensors 92 and 93 to conduct read operations by RFID system 40 to determine the number of towels 12 and 18 disposed in interior spaces 10 and 11, respectively.

Figure 4:
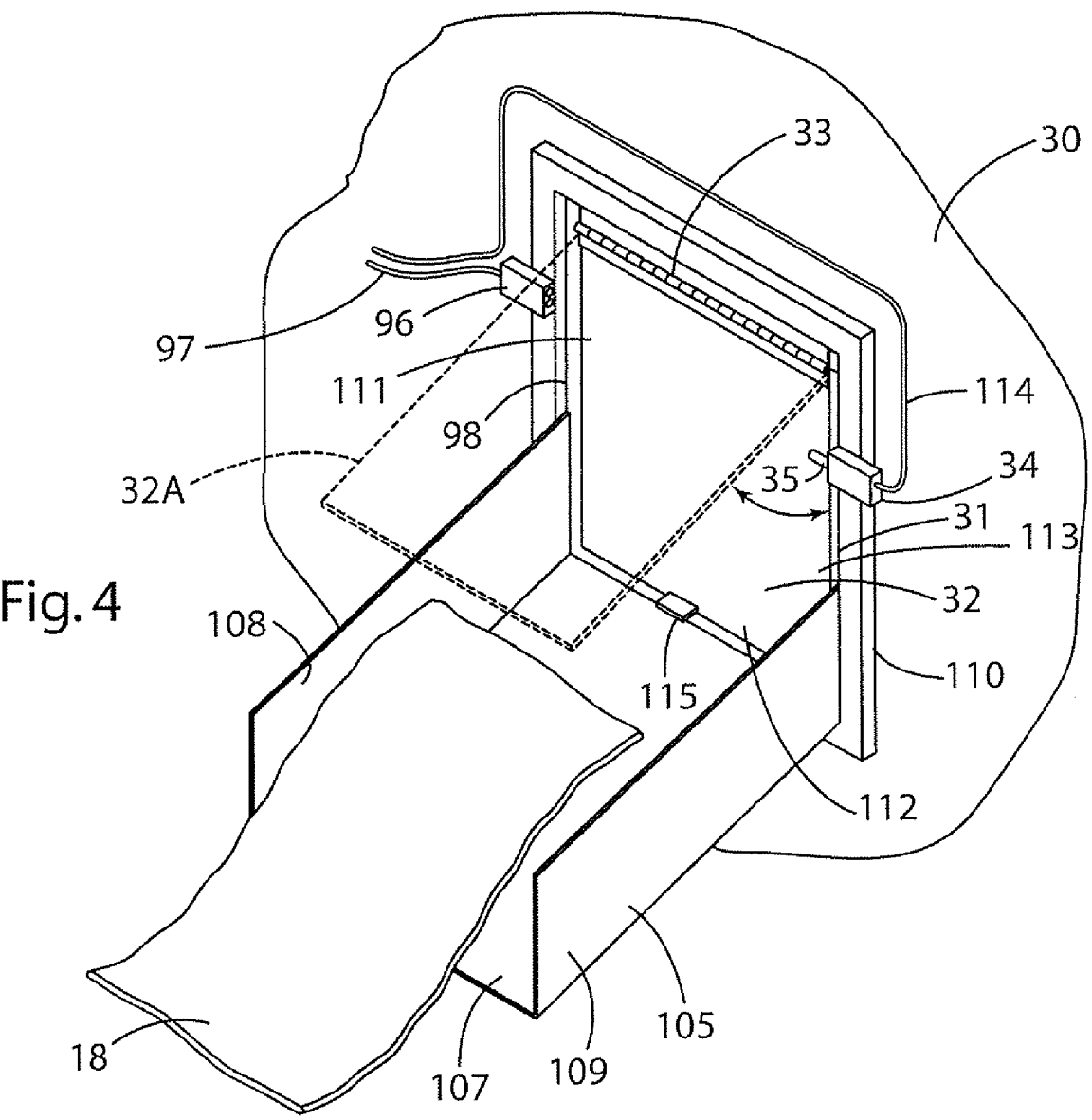
FIG. 4 is a partially fragmentary isometric view of a portion of the second main door and the return door and chute.

Referring again to FIGS. 1 and 2, a sensor 95 is mounted to first main door 20 of first cabinet 3. Sensor 95 is operably connected to control system 50, and generates a signal enabling controller 50 to determine if access door 22 is in the open or closed position. With reference to FIG. 4, a sensor 96 is operably connected to control system 50 by a line 97. Sensor 96 generates a signal to the control system 50 enabling the control system 50 to determine if return door 32 is in an open or closed position. In the illustrate example, sensor 96 comprises a read switch that generates a signal if a side edge 98 of return door 32 moves past sensor 96 upon closing return door 32.

Referring back to FIG. 1, a user input device or panel 100 may be mounted to main door 20 of first cabinet 3. User input device 100 includes a touch screen display 101 that is operably interconnected with the control system 50 to permit input of information by a user. The touch screen 101 may also be configured to display prompts or other information to a user. With reference to FIG. 2, PLC 52 may be mounted immediately adjacent card reader 55, and the PLC 52 may be operably interconnected with card reader 55 by communication lines 102. PLC 52 may be operably interconnected with other components 53 of control system 50 by a plurality of communication and/or power lines 103. Referring again to FIG. 1, in use, a user swipes card 56 through card reader 55, and server 60 of control system 50 compares data from the card 56 with a database of authorized users. If the card 56 is recognized, a "open door" or other message or indicator appears on touch screen 101, and the powered lock is actuated by control system 50 to shift the powered lock 23 to an open position. Control system 50 may be configured to keep the powered lock 23 in an open position for a predefined period of time (e.g. 3 seconds or 5 seconds). Control system 50 may also be configured to provide other indicators or signals to a user that lock 23 is in an unlocked position. For example, control system 50 could be operably connected to a speaker or other audio device that generates a buzzing sound or other audio signal when lock 23 is in the retracted/unlocked position. Control system 50 could also be operably connected to colored lights or other suitable visual indicator that signals when lock 23 is unlocked.

Referring again to FIG. 3, various electrical components and the like 53 of the power supply and control system 50 may be mounted to a movable mounting structure or tray 54. The tray structure 54 has an overall shape that is somewhat similar to a box, with a base side wall 125 and peripheral side walls 126-129 that extend transversely from side wall 125 to define a peripheral edge 130 of tray 54. The tray 54 thereby defines a shallow cavity or space 131 in which various electrical and power components 53 are mounted. Tray 54 is movably mounted to an upper structural portion 132 of cabinet 3 by hinges or the like, such that tray 54 can pivot to an open position (FIG. 3) for servicing of components 53 and the like mounted in tray 54. Tray 54 may also be pivoted to a closed position when the components are not being serviced. When tray 54 is in the closed position, side wall 125 is in a substantially horizontal position adjacent upper structure 132 of cabinet 3, such that the cavity or space 131 of tray 54 is substantially closed off relative to first interior space 10 of cabinet 3. It will be understood that the components 53 may comprise components of the RFID system 40, control system 50, and/or components of the power supply system 69. In the illustrated example, a wireless antenna 65 and communication module 135 may be mounted to an upper structure 136 of cabinet 4. Alternately, wireless antenna 65 and communication module 135 may be mounted in cabinet 3. As discussed above, one or more communications and/or power lines 57 may be utilized to interconnect cabinets 3 and 4. As discussed in more detail below, antenna 65 may be utilized to interconnect cabinets 3 and 4 to other computers and/or servers to thereby operably interconnect control system 50 to one or more host computers or systems.

Figure 5:
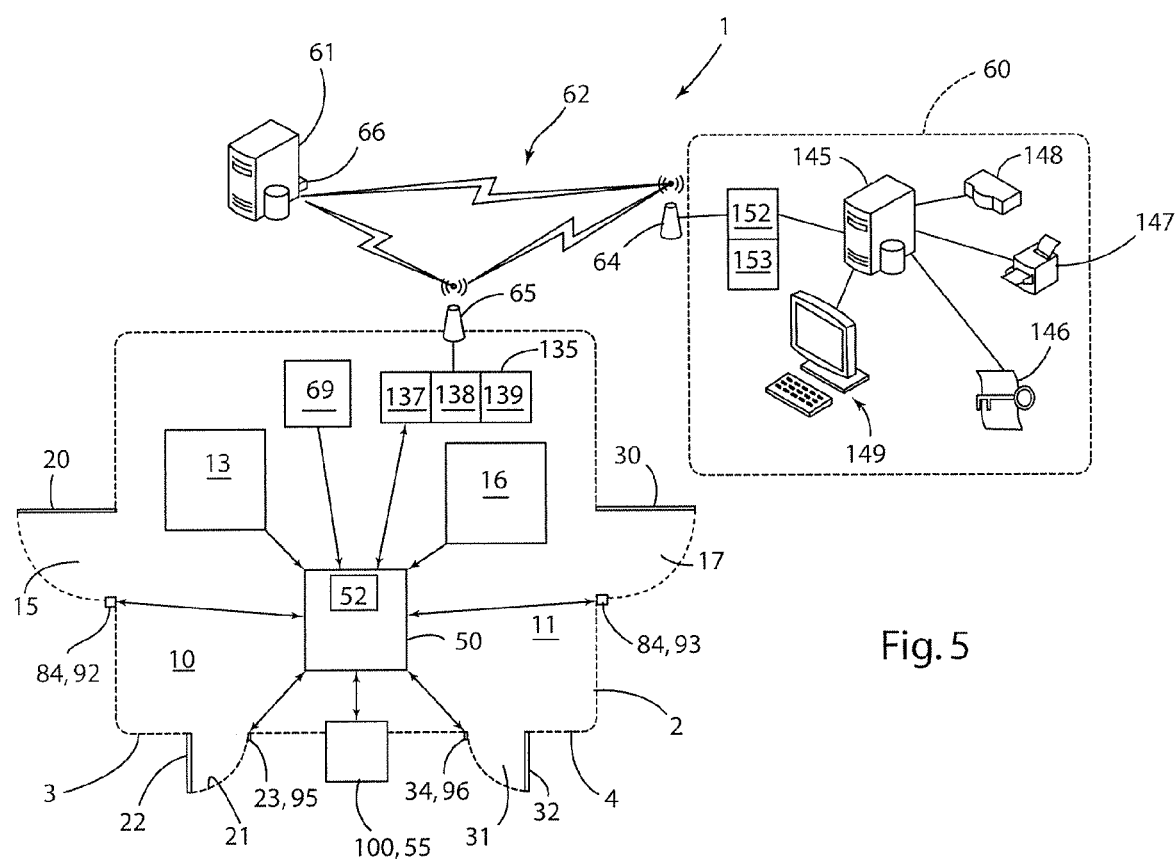
FIG. 5 is a schematic diagram of a system for dispensing and receiving items according to one aspect of the present invention.

Referring again to FIG. 2, an interface 140 is preferably disposed on a rear side of first cabinet 3. Interface 140 includes various ports that enable a lap top computer or the like to be operably interconnected with control system 50. The interface 140 preferably includes an RS232 port, a USB port, and an Ethernet port. Interface 140 also preferably includes a conventional 110 volt receptacle whereby a lap top or the like can be readily interconnected during servicing or the like of dispensing and tracking system 1. In general, interface 140 may be utilized to provide software updates to control system 50, perform diagnostic tasks, and the like. Alternately, software updates, diagnostic tasks, and the like may be performed by server 60, host computer 61, or other components that are operably interconnected by wireless network 62 (FIG. 5).

Referring again to FIG. 2, a chute 105 extends downwardly and inwardly from an inner side 106 of second main door 30 immediately adjacent second access opening 31 and return door 32. With further reference to FIG. 4, chute 105 has a generally U-shaped cross section including a lower web or wall 107 and upwardly extending side webs or walls 108 and 109. Side webs or walls 108 and 109 are preferably spaced-apart a dimension that is greater than a width of return door 32, such that the chute 105 does not interfere with return door 32 as it pivots inwardly to the position designated 32A (FIG. 4). The chute 105 ensures that used towels 18 inserted through second access opening 31 slide inwardly, and drop into mobile bin 16. A frame 110 extending around and defining second access opening 31 preferably has a height and width that is somewhat less than the dimensions of the return door 32, such that peripheral edge portions 111-113 of return door 32 overlap frame 110 when return door 32 is in a closed position. This prevents return door 32 from pivoting outwardly away from outer side face 36 (FIG. 1) of second main door 30.

Referring again to FIG. 4, an optional second powered lock 34 includes a movable extension 35 that is operably connected to a solenoid (not shown) or other powered actuator of second powered lock 34. When the extension 35 of second powered lock 34 is in the extended position shown in FIG. 5, return door 34 is locked in a closed position, such that it cannot move either inwardly or outwardly. Second powered lock 34 may include a spring (not shown) or other biasing device that biases extension 35 into the extended potion, and the solenoid or other powered actuator of second powered lock 34 may be configured to retract extension 35 when power is supplied to second powered lock 34 by power/data lines 114. The second powered lock 34 is operably connected to control system 50 and power supply 69 by power and communication lines 114. A magnetic latch 115 releasably retains return door 32 in the closed position. In use, if the control system 50 is in an on position, control system 50 will generate a signal causing extension 35 of second powered lock 34 to be in a retracted position unless predefined operating conditions are present. Specifically, in use, a user may cause return door 32 to pivot inward as used towels 18 are returned. As the return door 32 moves back to the closed position, movement of return door 32 relative to switch 96 causes switch 96 to generate a signal to control system 50. Once the return door 32 moves back to the closed position, controller 50 causes the RFID system 40 to conduct a read operation of second interior space 11. During the read operation, controller 50 causes extension 35 to remain in the extended position, thereby preventing return door 32 from being opened during a read operation. After completion of the read operation, controller 50 causes extension 35 of second powered lock 34 to retract, thereby permitting return of additional used towels 18 through second access opening 31.

Figure 6:
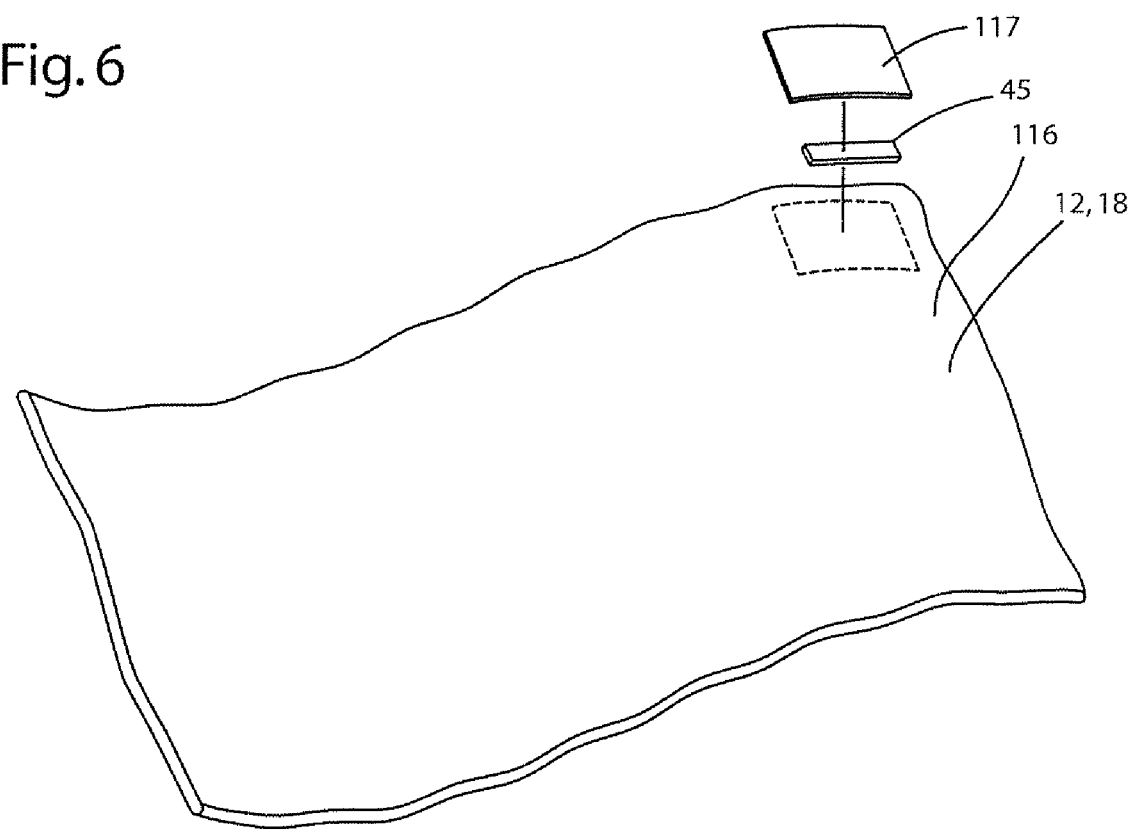
FIG. 6 is an exploded isometric view of a towel and RFID tag according to one aspect of the present invention.

With further reference to FIG. 6, the towels 12 and 18 may comprise a conventional towel 116, and an RFID tag 45 may be secured to towel 116 by use of a small patch 117 or the like that is sewn or otherwise secured to towel 116. RFID tag 45 is preferably a commercially available RFID tag that is configured to withstand laundering and the like.

Referring again to FIG. 5, the article dispensing and tracking system 1 may include cabinet structure 2, a server 60, and a host computer 61 that are operably interconnected by a wireless network 62 or other suitable network. Host computer 61 may comprise a preexisting computer previously utilized by a health club or other such facility to store information concerning members, generate billing information, etc. It will be apparent that access door 22 could be mounted to other portions of the cabinet structure 2 other than first main door 20. Similarly, return door 32 may be mounted to other portions of cabinet structure 2 other than second main door 30. As discussed above, the powered locks and open/closed sensors for first and second main doors 20, 30, and for access door 22 and return door 32 are operably connected to control system 50, which may include a controller 52. Controller 52 may comprise a PLC, PC, or other suitable unit. Communications modules 135 may also be operably interconnected with control system 50. The communication modules 135 may include a Local Area Network (LAN) 137, a wireless bridge 138, and an RF module 139. A server 60 may be positioned remote from cabinet structure 2. Server 60 may comprise a PC 145 including software utilized by a health club or the like to verify data received from a card reader 146 or the like positioned at a front desk of the facility. In general, server 60 may include a printer 147 utilized for printing reports concerning the number of unreturned towels associated with a particular user, and other such uses. An uninterruptable power supply (UPS) 148 may also be utilized in connection with server 60. A conventional data entry and access unit 149 may also be utilized. The unit or components 149 may comprise a computer screen, keyboard, computer mouse and/or other such components. Server 60 may also include a Network Interface Card (NIC) module 152 and a LAN communications module 153. An optional computer host system 61 may also be operably interconnected with the other components by a wireless network 62 or the like.

In use, cabinet 3 is initially stocked with a plurality of clean towels 12. This is accomplished by unlocking locks 84, opening first main door 20, and rolling mobile rack 13 with clean towels 12 into first interior space 10. First main door 20 is then returned to a closed position. Controller 50 is configured to actuate RFID system 40 to perform a read operation when sensor 92 generates a signal indicating the first main door 20 has been opened and closed. Control system 50 thereby generates an initial inventory list of all clean towels 12 disposed in first interior space 10. In general, RFID tags 45 (FIG. 6), each have a unique code, such that control system 50 can generate an inventory concerning not only the total number of clean towels 12 disposed in first interior space 10 but can also generate an inventory of the specific clean towels that are initially disposed in first interior space 10. In the illustrated example, a clean towel inventory of clean towels disposed in cabinet 3 is stored in a controller/memory unit of RFID system 40.

Also, during initial set up of dispensing and tracking system 1, an empty mobile bin 16 is positioned in cabinet 4. This is accomplished by unlocking locks 84, opening second main access door 30, and rolling mobile bin 16 into second interior space 11. Control system 50 is configured to actuate RFID system 40 to conduct a read operation when sensor 93 generates a signal indicating that second main door 30 has been opened and closed. Control system 50 then generates an inventory of any used towels 18 that may be disposed in second interior space 11. In the illustrated example, a used or returned towel inventory of towels 18 disposed in cabinet 4 is stored in a controller/memory unit of RFID system 40.

If a user desires to remove clean towels 12 from cabinet 3, the user provides control system 50 with user verification data. In the illustrated example, a user swipes a membership card 56 through card reader 55, and server 60 of control system 50 compares the ID input data to a database of authorized users stored on server 60. If the data entered satisfies predefined criteria for authorized users, control system 50 causes first powered lock 23 to unlock for a predefined period of time, and control system 50 may also generate a signal causing touch screen 101 or other device to provide the user with a signal that the powered lock 23 is unlocked. For example, touch screen 101 may provide a "open door and remove towels" signal, or a buzzer, light, or the like may be used to indicate to the user that the access door 22 may be opened. A user then opens door 22 and removes the desired number of clean towels 12 from first interior space 10 through first enlarged opening 15, and closes access door 22. Control system 50 is configured to cause RFID system 40 to conduct a read operation of first interior space 10 if control system 50 determines that access door 22 has been opened and closed. Control system 50 then updates the clean towel inventory list for first interior space 10 to account for towels that have been removed by a user, and server 60 associated with control system 50 stores data concerning the towels removed and assigns the removed towels to a user identified utilizing the user data entered using membership card 56 just prior to actuation of powered lock 23. In the illustrated example, PLC 52 of control system 50 causes RFID system 40 to conduct a read operation upon opening and closing of door 22. RFID system 40 stores the results of this read operation as the "new" clean towel inventory, and also takes the difference between the prior clean towel inventory and the "new" clean towel inventory to generate a list of towels that have been removed from cabinet 3. The RFID system 40 transmits the list of towels that were removed from cabinet 3 to PLC 52, and PLC 52 transfers the list to server 60 which assigns or associates the list of remove towels with a specific user based on the user ID information obtained from card reader 55 just prior to unlocking powered lock 23. The list of removed towels and corresponding user ID information may be transmitted from server 60 to system 61, or it may be stored in memory of server 60.

To return used towels 18, a user pushes on return door 32, placing the used towels 18 in chute 105 (see also FIG. 4). The used towels 18 then slide down chute 105 and drop into mobile bin 16. When return door 32 returns to the closed position, sensor 96 (FIG. 4) generates a signal, and control system 50 then causes RFID system 40 to conduct a read operation of second interior space 11. If system 1 includes a second powered lock 34, control system 50 may be configured to cause second powered lock 34 to remain in the locked position during the read operation of second interior space 11. Control system 40 compares data from a read operation that has just been conducted to data from a prior read operation (e.g. a returned towel inventory) and determines which used towels 18 have just been returned to return cabinet 4. Server 60 may then update the data stored by system 61 concerning towels that had been checked out/associated with a specific user previously identified from membership card 56, and also replaces the prior returned towel inventory with data from the most recent read operation. In the illustrated example, the returned to inventory list is stored in a controller/memory unit of RFID system 40.

Server 60 of control system 50 may be configured to automatically generate a list of users who have unreturned towels for more than a specified period of time. For example, server 60 of control system 50 may be configured to generate a list of users who have had towels for an unacceptably long period of time. For example, if towels taken out by a specific user have not been returned by the end of the day in which the towels were removed, server 60 may generate a list of unreturned towels associated with, or assigned to, specific users. Alternately, server 60 of control system 50 may be configured to generate such a list of towels based on a longer period of time to provide for situations in which a user returns the towels at a later time. Also, server 60 of control system 50 may be configured to generate a list only if other criteria are also present, for example, server 60 of control system 50 may be configured to generate a list of users who have had towels removed for an unacceptably long period of time only if more than a predefined number of towels have been unreturned for a predefined period of time. For example, server 60 of control system 50 may be configured to generate a list of users who have had five or more towels for more than 30 days. Still further, server 60 of control system 50 may be configured to generate a signal to the computer 61 at a front desk of a health club or the like, such that employees of the facility receive a signal on computer screen 149 or the like if a user having unreturned towels utilized card reader 146 (FIG. 5) at the time a member entered the facility. Also, server 60 of control system 50 may be configured to interface with accounting and billing software systems of the facility, such that members are automatically billed if the individual members have had a specified number of unreturned towels for a specified period of time.

According to another aspect of the present invention, server 60 of control system 50 may be operably interconnected to a central data storage/processing center utilizing a global computer network. A plurality of health clubs or other such facilities having one or more dispensing and receiving systems 1 may be operably connected to the central data storage/processing center to thereby process information concerning members of a plurality of facilities. The data storage/processing center utilizes data from each system 1 to generate invoicing or other reports concerning individual members or users of the systems 1 in the network.

It will become apparent to those skilled in the art that various modifications to the preferred embodiment of the invention as described herein can be made without departing from the spirit or scope of the invention as defined by the appended claims.

The invention claimed is:

1. A dispensing and receiving system for dispensing clean towels and for receiving used towels, the system comprising:
   a cabinet structure having a first portion defining a first interior space configured to have clean towels disposed therein, and a second portion defining a second interior space configured to have used towels disposed therein, the cabinet structure having an enlarged first opening providing access to the first interior space, and an enlarged second opening providing access to the second interior space;
   the cabinet structure including a first main door that is movable between an open position providing access to the first interior space through the enlarged first opening, and a closed position wherein the first main door closes off the enlarged first opening, the first portion of the cabinet structure having a first access opening that provides access to the first interior space to thereby permit a user to reach through the first access opening when the first main door is in the closed position, and a closed position that prevents access to clean towels in the first interior space;
   an access door movably mounted to the first portion of the cabinet structure for movement between an open position permitting a user to reach through the first access opening when the first main door is in the closed position, and a closed position that prevents access to clean towels in the first interior space;
   the cabinet structure including a second main door movable between an open position providing access to the second interior space through the enlarged second opening, and a closed position wherein the second main door closes off the enlarged second opening, the second portion of the cabinet structure having a second access opening to the second interior space;
   a return door movably mounted to the second portion of the cabinet structure for movement between an open position that permits one or more towels to pass through the second access opening into the second interior space, and a closed position preventing access to the second interior space;
   a powered lock selectively preventing movement of the access door to the open positions;
   a plurality of towels having RFID tags attached thereto;
   an RFID system including at least a first RFID antenna configured to provide electromagnetic waves in the first interior space, and at least a second RFID antenna configured to provide electromagnetic waves in the second interior space;
   wherein the RFID system is configured to perform read operations during which at least one of the first and second antennas generate electromagnetic energy and receive return energy from RFID tags disposed in the first and second interior spaces, whereby a number of towels disposed in the first and second interior spaces can be determined;
   wherein, during read operations, electromagnetic energy from the first RFID antenna does not enter the second interior space, and the electromagnetic energy from the second RFID antenna does not enter the first interior space;
   a user verification device that collects data that can be used to identify a user; and a control system operably interconnected to the powered lock and the first and second RFID antennas, wherein the control system is configured to actuate the RFID system and generate a first data set corresponding to a number of the towels in the first interior space upon opening and/or closing of the first main door, the control system selectively controlling the powered lock to unlock the access door based, at least in part, on data from the user identification device, and wherein the control system is configured to actuate the RFID system and generate a second data set corresponding to a number of towels in the first interior space, such that a number of towels removed from the first interior space can be determined by taking a difference between the first and second data sets.

2. The dispensing and receiving system of claim 1, wherein:
the controller is configured to actuate the RFID system to perform a read operation of the first interior space only if the access door is in a closed position.

3. The dispensing and receiving system of claim 2, wherein:
the controller is configured to control the powered lock such that the access door cannot be opened when the RFID system is performing a read operation of the first interior space.

4. The dispensing and receiving system of claim 3, including:
a sensor configured to generate a signal from which it can be determined if the access door is in the open or closed positions.

5. The dispensing and receiving system of claim 3, wherein:
the controller is configured to cause the RFID system to perform a read operation and generate data concerning a number of the towels in the second interior space if the return door has been opened and/or closed.

6. The dispensing and receiving system of claim 5, wherein:
the powered lock comprises a first powered lock, and including:
a second powered lock selectively retaining the return door in the closed position, and wherein:
the controller is configured to prevent opening of the return door during a read operation of the second interior space.

7. The dispensing and receiving system of claim 1, wherein:
the controller is configured to cause the RFID system to perform a read operation and generate initial data concerning a number of the towels disposed in the second interior space if the second main door is opened and/or closed; and
the controller is configured to cause the RFID system to perform a read operation and generate initial data concerning a number of the towels disposed in the first interior space if the first main door is opened and/or closed.

8. The dispensing and receiving system of claim 7, including:
a mobile towel storage rack having a plurality of vertically spaced-apart horizontal support surfaces, and a plurality of rollers adapted to movably support the storage rack on a floor surface; and
wherein the enlarged first opening is configured to permit the storage rack to be rolled into the first interior space and out of the first interior space when the cabinet structure is positioned on a floor surface in an upright position.

9. The dispensing and receiving system of claim 8, including:
a mobile bin having an enlarged upwardly-facing opening that is positioned adjacent and below the return door when the mobile bin is disposed in the second interior space.

10. The dispensing and receiving system of claim 9, wherein:
the mobile bin includes a plurality of rollers configured to movably support the mobile bin on a floor surface; and
wherein the enlarged second opening is configured to permit the mobile bin to be rolled into the second interior space and out of the second interior space when the cabinet structure is positioned on a floor surface.

11. The dispensing and receiving system of claim 10, wherein:
the cabinet structure includes a chute positioned below the return door on an interior side of the second main door extending inwardly and downwardly from the interior side of the second main door, the chute having a lower end positioned within a perimeter of the upwardly-facing opening of the mobile bin when the mobile bin is disposed in the second interior space such that towels placed on the chute slide downwardly and drop into the mobile bin.

12. The dispensing and receiving system of claim 10, wherein:
the cabinet structure comprises a first cabinet forming the first interior space, and a second cabinet forming the second interior space, and wherein the first and second cabinets are spaced-apart to form a gap therebetween.

13. The dispensing and receiving system of claim 12, wherein:
the first cabinet is movable relative to the second cabinet.

14. The dispensing and receiving system of claim 13, wherein:
the control system includes a programmable controller mounted to a selected one of the first and second cabinets; and
including a plurality of lines operably connecting the programmable controller with the other one of the first and second cabinets, and wherein at least one of the lines is selected from a group consisting of power lines and data transmission lines.

15. The dispensing and receiving system of claim 12, wherein:
the control system includes a programmable controller and a computer positioned remotely relative to the programmable controller and operably connected thereto whereby data can be transferred from the computer to the programmable controller and from the programmable controller to the computer.

16. The dispensing and receiving system of claim 15, wherein:
the control system includes a programmable controller mounted to a selected one of the first and second cabinets; and
wherein the computer and the programmable controller are interconnected by a wireless network.

17. The dispensing and receiving system of claim 15, wherein:
the system for dispensing clean towels and for receiving used towels is configured to be used in a health club, and the computer is configured to process information concerning specified individuals who are authorized to use at least some of a health club's facilities based on predefined criteria; and the computer is programmed to associate any unreturned towels with specified individuals based on predetermined criteria.

18. The dispensing and receiving system of claim 17, wherein:

the control system is configured to generate unreturned towel data including the number of unreturned towels for one or more specified individuals based on predefined past due criteria.

19. The dispensing and receiving system of claim 18, wherein:

the predefined past due criteria includes data indicating that a specified individual has not returned towels to the second interior space that were taken from the fist interior space by the specified individual.

20. The dispensing and receiving system of claim 19, wherein:

the control system reduces the number of unreturned towels for a specified individual if a subsequent read operation indicates that a previously unreturned towel is disposed in the first interior space.

21. The dispensing and receiving system of claim 20, wherein:

the control system is configured to generate a charge associated with specified individuals for unreturned towels if the specified individuals have unreturned towels for longer than a predefined period of time.

22. The dispensing and receiving system of claim 1, wherein:

the user verification device comprises a card reader mounted to the first main door, and wherein the card reader is configured to read an optical barcode on a card.

23. The dispensing and receiving system of claim 12, wherein:

the system for dispensing clean towels includes a first number of first cabinets configured to dispense clean towels, and a second number of second cabinets configured to receive used towels, and wherein the first number is not equal to the second number, and wherein each of the first and second cabinets is operably interconnected to a server that receives and processes data from each of the first and second cabinets.

24. The dispensing and receiving system of claim 23, wherein:

the system comprises a plurality of first cabinets and a plurality of second cabinets, wherein the first cabinets are substantially identical to one another, and wherein the second cabinets are substantially identical to one another.

* * * * *